United States Patent [19]

Lagow

[11] 4,076,916

[45] Feb. 28, 1978

[54] FLUORINATED FUNCTIONALIZED POLYMERS

[75] Inventor: Richard J. Lagow, Manchester, Mass.

[73] Assignee: Massachusetts Institute of Technology, Cambridge, Mass.

[21] Appl. No.: 627,999

[22] Filed: Nov. 3, 1975

[51] Int. Cl.$^2$ .............................................. C08F 8/22
[52] U.S. Cl. ...................................... 526/43; 526/15; 526/16
[58] Field of Search ........................ 526/43, 16, 15, 14

[56] References Cited

U.S. PATENT DOCUMENTS

| 3,758,450 | 9/1973 | Margrave et al. | 526/43 |
| 3,865,615 | 2/1975 | Manly | 117/47 A |

FOREIGN PATENT DOCUMENTS

| 789,562 | 1/1973 | Belgium | 526/43 |

Primary Examiner—William F. Hamrock
Attorney, Agent, or Firm—Arthur A. Smith, Jr.; David E. Brook

[57] ABSTRACT

A method is disclosed for fluorinating functionalized polymeric materials which contain pendant ester, carboxylic acid, acid halide or acid anhydride groups. Non-fluorinated or partially fluorinated polymers containing such pendant groups are placed in a direct fluorination apparatus and a mixture of elemental fluorine and an inert gas is passed over the material using LaMar fluorination techniques. The polymer backbone is perfluorinated while the pendant groups are maintained or converted to acid fluoride groups; in either case, the pendant noncarboxylic acid groups are easily convertible to such acid groups by hydrolysis. These fluorinated functionalized polymers are useful, per se, as ion exchange membranes, solid electrolytes, conductive films, etc., and, in addition, various reactants can be tacked onto such fluorinated polymers thereby making them useful in many other applications.

9 Claims, 1 Drawing Figure

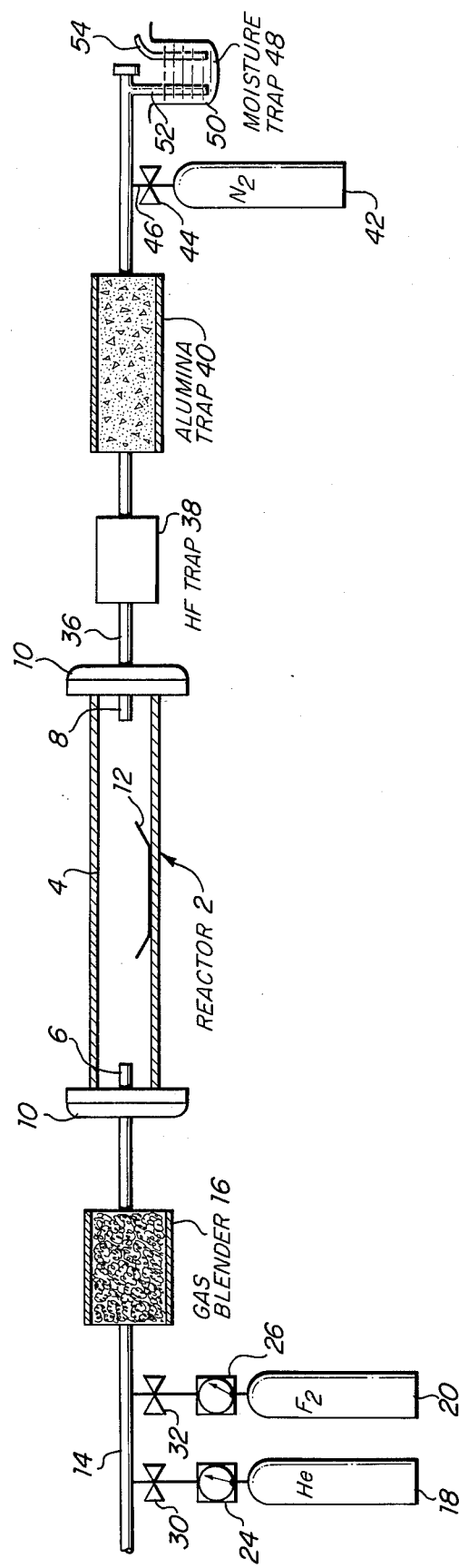

FLUORINATED FUNCTIONALIZED POLYMERS

BACKGROUND OF THE INVENTION

1. Field of the Invention

This invention is in the field of fluorine chemistry and more particularly in the field of direct fluorination.

2. Description of the Prior Art

Although polymers have been known and manufactured for many years, it has only been recently that significant efforts have been initiated to take advantage of functional groups on polymer surfaces. Such functional groups could provide new uses for the base polymers due to the nature of the functional group, or the functional group could provide a reactive site on the polymer surface so that a variety of chemical compounds could be reacted with the polymer.

One of the earlier applications for functionalized polymers involved the development of peptide syntheses based on chloromethylated polystyrene. See G. R. Stark, "Biochemical Aspects of Reactions on Solid Supports", Academic Press, New York (1971). These procedures avoided repetitious purifications in the syntheses of complicated peptides, and such techniques have become so successful that these "Merrifield resins" are now widely used and are commercially available. Chloromethylated polystyrene has also been used in more conventional organic synthesis work such as the promotion of intramolecular reactions without high dilution apparatus and the separation of polymer bound triphenylphosphine oxide after a Wittig reaction. See J. I. Crowley and H. Rapaport, *J. Amer. Chem. Soc.*, 92, 6363 (1970); M. A Draus and A. Patchornik, *Israel J. Chem.*, 9, 269 (1971); S. V. McKinley and J. W. Rakshys, *Chem. Comm.* 134 (1972); and, F. Camps, J. Castells, J. Font and F. Vela, *Tetrahedron Lett.*, 1715 (1971).

Polystyrene has also been functionalized and subsequently used to form heterogeneous catalysts by reacting homogeneous catalysts with the functional groups. See R. H. Grubbs, C. Gibbons, L. C. Kroll, W. D. Bonds and C. H. Brubaker, *J. Amer. Chem. Soc.*, 95, 2373 (1973); and, R. H. Grubbs, L. C. Kroll and E. M. Sweet, *J. Macromol. Sci. Chem.*, A7, 1047 (1973). Heterogeneous catalysts have advantages over their homogeneous counterparts because they can be prepared in a more reactive form since dimerization reactions that occur in solution cannot occur with the bound species and because they are more easily recoverable.

In addition to the effort directed to the functionalization of polystyrene, some effort has been made to functionalize polyethylene. It has been recognized that polyethylene functionalized with carboxylic acid groups, for example, would be particularly useful because of the chemical and mechanical properties of polyethylene and because of the ease with which carboxylic acid units can be converted to esters, amides, ketones, etc. Several different oxidation procedures have been reported in the literature as successfully forming carboxylic acid groups on polyethylene surfaces. See B. G. Aristov, I. Yu. Babkin, F. K. Borisova, A. V. Kiselev and A. Ya. Korolev, *Izv. Acad, Nauk, SSSR, Otd. Khim.*, 6, 1017 (1963); *Akad, Nauk, SSSR, Bulletin*, 927 (1963); F. H. Ancker and F. L. Baier, U.S. Pat. No. 3,556,955 (1971); and, R. L. Augustine, Ed., "Oxidation, Vol. I", Marcel Dekker, New York, 1969, p6.

Although most of the effort to functionalize polymers to date has been directed towards simply adding acid or other reactive groups to polystyrene and polyethylene, it would be desirable to be able to add functional groups to the class of polymers known as fluoropolymers. Fluoropolymers are known to exhibit outstanding high temperature properties and are also unusually chemically inert. Because of these properties, they are used in applications where severe environmental factors are encountered.

One attempt to functionalize and fluorinate polymers is the method described by Manly in U.S. Pat. No. 3,865,616. This method involves contacting polyolefins or certain polyesters with a mixture of oxygen and fluorine to produce oxyfluorinated polymers containing reactive carboxyl groups. Plasminokinase enzymes, which activate plasminogins to plasmin, are then reacted with the carboxyl groups to form non-thrombogenic surfaces. Suitable polyolefins are disclosed to be polyethylene, polypropylene or ethylene-propylene copolymers. Suitable polyesters are disclosed to be those formed by reacting a dibasic carboxylic acid with a difunctional alcohol to form a condensation polyester having the repeating unit —[CO(R)COO($R_1$)O]— wherein R and $R_1$ are independently chosen from linear or cyclic hydrocarbons.

Functionalization of fluoropolymers has heretofore been very limited, however, probably due to a number of factors. Fluoropolymers are extremely inert so that functionalization of the fully fluorinated polymer is unlikely to succeed. Alternatively, polymerization of fluorinated monomers containing functional groups is difficult for steric reasons, i.e., the bulkiness of the functional group interferes with polymerization.

Another problem has been the difficulty in carrying out the fluorinations themselves. Whereas many compositions can be directly chlorinated or brominated, it has been recognized that fluorine is dissimilar to these halogens in regard to direct halogenation. See McBee et al., U.S. Pat. No. 2,533,132 and U.S. Pat. No. 2,614,129. In fact, even though direct fluorination is a highly desirable process, prior attempts to use direct fluorination have often produced low to mediocre yields. Additionally, the yields are known to decrease as the molecular complexity of reactants becomes greater, thereby making direct fluorination of polymers an even more difficult matter. It is stated in one literature article, for example, that the yield of required fluorocarbon decreases as the molecular complexity of a hydrocarbon precurser increases, and it is difficult to fluorinate hydrocarbons above $C_{10}$ without extensive decomposition occurring. See R. E. Banks, "Fluorocarbons and Their Derivatives", Oldbourne Press, London, p. 7 (1964).

Direct fluorination reactions involving elemental fluorine are also characterized by quick evolution of large quantities of heat, ignition and flaming which promote product decomposition, often with explosive violence. In fact, the inability to control direct fluorination reactions to produce high yields of the desired fluorinated reactant without concomitant fragmentation of the desired product has prevented direct fluorination from becoming a widely accepted method of fluorination. Because of these problems, a very diversified art has been developed to circumvent or obviate the use of fluorine gas by using inorganic, metallic fluorides, hydrogen fluoride, or electrolytic cells where no free fluorine is produced.

Direct fluorination of polymers containing pendant groups has even been more limited. In fact, it is suggested in the patent literature that treatment of polyfluoroalcohols with elementary fluorine results in destructive fragmentation of the carbon chain and loss of the functional group at the end of the chain. See Stallmann, U.S. Pat. No. 3,038,941.

SUMMARY OF THE INVENTION

The invention relates to a method for fluorinating functionalized polymeric materials containing pendant ester, carboxylic acid, acid halide or acid anhydride groups. Non-fluorinated or partially fluorinated polymers containing such pendant groups are subjected to a fluorinating agent. The preferred fluorinating agent is elemental fluorine gas which is diluted with an inert gas, such as helium, according to La-Mar direct fluorination techniques. These fluorinations can be carried out at room temperature and atmospheric pressure, although other temperature and pressure conditions can be used if necessary or desirable.

Most modern approaches to direct fluorinations with elemental fluorine are really attempts to circumvent the problem of the great reactivity of fluorine. In La-Mar direct fluorinations, the reactions are controlled by a careful balancing of the basic kinetic and thermodynamic factors involved. Basically, the rate of reaction is slowed down so that energy liberated can be absorbed or carried away without becoming appropriately localized and available to rupture bonds. Such factors as the stereochemistry of the fluorocarbons, dilution technique, molecular relaxation processes such as vibration or rotational relaxation, and thermal conduction are considered and tailored to both reduce the number of fluorine collisions on the same molecules or on adjacent reaction sites and to provide a heat sink to remove or absorb resulting energy.

During the fluorination, hydrogen atoms on the polymer backbone are extracted and replaced with fluorine atoms. Perfluorination or any lesser degree of fluorination can be achieved. Pendant ester, carboxylic acid, acid halide (other than fluoride) or acid anhydride groups are preserved or converted to acid fluoride groups. All of the non-carboxylic acid groups can be readily hydrolyzed to form such pendant acid groups.

The presence of functional groups on the fluorinated polymer make it useful, per se, and also provide reactive sites which make the polymer useful for additional applications. For example, many compounds can be reacted directly with the acid or acid fluoride group to tack species onto the polymer. Thus, carboxylic acid groups on the fluorinated polymer can be reacted with alcohols to form esters, amines to form amides, etc. Additionally, acid fluoride groups themselves can be reacted with certain homogeneous catalysts to convert them into heterogeneous catalysts.

BRIEF DESCRIPTION OF THE DRAWING

The FIGURE illustrates schematically an apparatus suitable for practicing the invention described herein.

DESCRIPTION OF PREFERRED EMBODIMENTS

It is preferred to use La-Mar fluorination techniques to fluorinate the functionalized polymers described herein. In the La-Mar process, the material to be fluorinated is placed in a reaction chamber and an inert atmosphere such as helium is introduced. Fluorine gas or an inorganic fluoride is introduced into the inert atmosphere in a very low initial concentration such as not to exceed about 6% at the end of 30 minutes. The temperature is maintained at a uniform low temperature so as to avoid uncontrolled fluorination. The La-Mar direct fluorination process is further disclosed in the following references, the teachings of which are hereby incorporated by reference. R. J. Lagow and J. L. Margrave, "Direct Fluorination of Organic and Inorganic Substances", *Proc. Natl. Acad. Sci.*, 67, 4, 8A (1970); R. J. Lagow and J. L. Margrave, 48, 40 (Jan. 12, 1970); R. J. Lagow and J. L. Margrave, "The Controlled Reaction of Hydrocarbon Polymers with Elemental Fluorine", *Polymer Letters,* 12 (April, 1974); A. J. Otsuka and R. J. Lagow, "The Direct Fluorination of Hydrocarbon Polymers", *J. Fluorine Chemistry* (May, 1974); and U.S. patent application Ser. Nos. 718,128 (1968); 133,804 (1971); 133,803 (1971); and 133,865 (1971).

An apparatus suitable for carrying out a La-Mar fluorination is illustrated in the FIGURE. A horizontal cylindrical reactor 2 has wall members 4, which are preferably fabricated from fluorinated nickel, although other materials which are inert to fluorine can also be used. Reactor 2 has a gas inlet 6, where reactants are introduced, and an outlet 8, where excess reactants exit from reactor 2. Teflon ® o-rings, to provide a tight seal between reactor 2, gas inlet 6 and product outlet 8, and these flanges are also removable to provide access to reactor 2.

Solid polymeric reactants to be fluorinated and functionalized are placed in reactant vessel 12 which can be placed into or taken from reactor 2 by removing either flange 10. Fluorine gas, as well as any inert carrier gases, are fed to reactor 2 through inlet line 14 which can be fabricated from copper tubing. A gas blender 16 is provided prior to gas inlet 6 and serves to thoroughly mix each of the individual gases passing through inlet line 14 so that a homogeneous gas mixture enters reactor 2. A suitable gs blender can be formed from a brass cylinder containing fine copper turnings. Sources of inert and fluorine gases are connected to inlet line 14; as illustrated, gas cylinders 18 and 20 contain helium and fluorine, respectively. Flowmeters 24 and 26 and control valves 30 and 32 are used to monitor and control the flow of each of these gases. Excess fluorine, inert gases, and other products exit from reactor 2 by outlet 8 and pass through outlet line 36 through HF trap 38 and alumina trap 40, used to trap exiting hydrogen fluoride and fluorine, respectively. Nitrogen from cylinder 42 is bled into outlet line 36 by opening nitrogen valve 44; nitrogen gas passes through supply line 46 and into outlet line 36 wherein it passes to moisture trap 48, consisting of a beaker 50, partially filled with liquid, inlet line 52 and glass tube 54 which is open to the atmosphere.

The apparatus illustrated can be used to fluorinate and functionalize polymer materials as follows. Polymeric reactants to be fluorinated are placed in vessel 12 which in turn is placed in reactor 2. Flanges 10 are placed in position and tightened. Reactor 2 is flushed with a relatively high flow of helium by opening valve 30. The flow of helium is then reduced and valve 32 is opened to begin fluorine flow. The initial flow of fluorine is kept low in relation to the helium flow so that it forms a low concentration of the total gas fed to the reactor; the concentration of fluorine is raised as fluorination proceeds by opening valve 34 and/or tightening valve 30. If desired, valve 30 can be closed after some period so that the polymer reactant is fully fluorinated except where it has been functionalized.

The polymers which can be functionalized and fluorinated by the methods described herein have hydrocarbon backbones with pendant ester, carboxylic acid, acid halide or acid anhydride groups.

Polymers having pendant ester groups include polymers of alkyl esters of acrylic, methacrylic and ethacrylic acid. Suitable examples include polymethyl acrylate, methacrylate, or ethacrylate; polyethyl acrylate, methacrylate, or ethacrylate; etc. The main reaction with such esters, including hydrolysis to the acid, can be illustrated with polymethyl methacrylate as follows:

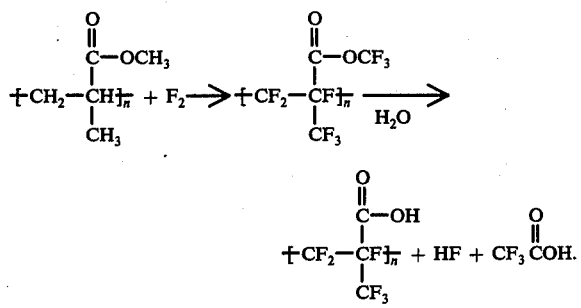

In addition to the fluorination reaction shown, some small amount of the ester group is believed to be converted to acid fluoride groups which can also be hydrolyzed to the acid functionality.

Other polymers containing pendant ester groups are polyallylic esters. Suitable examples include polyallylic acetate or polyallylic formate. Fluorination of such polymers, including hydrolysis, can be illustrated with polyallylic acetate as follows:

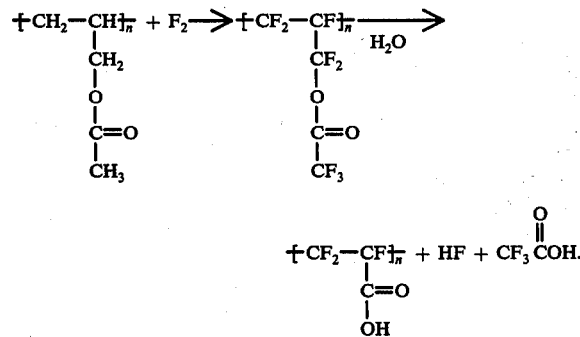

Polymers having pendant carboxylic acid groups include polymers of acrylic acid or methacrylic acid. Suitable examples include polyacrylic acid or polymethacrylic acid and copolymers of acrylic acid with other vinyl unsaturated monomers. It is preferred to react pendant carboxylic acid groups with a source of fluorine, such as hydrogen fluoride, to form an acid fluoride group, prior to carrying out the direct fluorination. Such pretreatment tends to preserve the functional group during the direct fluorination.

Polymers containing acid halide groups, such as acid chloride, acid bromide, or acid fluoride, are also suitable, as are polymers containing acid anhydride groups such as polymers containing maleic anhydride. Also, copolymers containing any of the aforementioned suitable monomers with any other comonomers are also suitable.

Polymer materials to be fluorinated can have a wide variety of physical forms including powders, films, membranes, frits, pellets, rods, etc. When it is desired to completely fluorinate solid materials except for the functional sites, it is preferable to grind the material to a particle size of less than 100 mesh so that the fluoride is able to diffuse into the center of the particle to react. If larger particles are used, an unfluorinated core of material will remain in the center of the particle.

Shaped articles can be formed from the polymers and subsequently fluorinated. Non-fluorinated polymers are, in general, easier to mold, extrude, etc. than their fluorinated counterparts, but the advantages of the fluorinated species can be obtained by the techniques described herein. Thus, bottles can be formed, for example, from polymethyl methacrylate, and the bottle can subsequently be fluorinated and functionalized. Similarly, extruded tubes or rods, filaments, woven articles, etc. can be fluorinated.

Fluorine gas is the preferred fluorinating agent and is available commercially at high purity levels. Other sources of fluorine, although not preferred, can be used, including chlorine trifluoride or bromine trifluoride. These latter sources of fluorine do, however, typically result in products which are partially chlorinated or brominated.

Because of the tendency of fluorine to fragment materials, small concentrations of fluorine are introduced initially to the material in the reactor to be fluorinated. One method for delivering these low concentrations is to dilute the fluorine with an inert gas, such as helium or neon. Alternatively, the fluorine can be introduced at very low flow rates until partial fluorination has been achieved, after which the flow rate can be increased.

The fluorination reactions described herein can be conveniently carried out at room temperature and atmospheric pressure. These conditions are clearly preferred. Temperatures used should not exceed about 300° C in any case since acid fluoride groups are not stable at such temperatures.

For reactions at room temperature and atmospheric pressure, the horizontal cylindrical reactor illustrated in the FIGURE can be used as well as vertical reactors which operate as fluidized beds. The process described herein is not limited by the reactor, however, and the process can even be carried out in a static reactor, such as a bomb reactor, in which elevated temperatures and pressures are used, if desired.

Although not required, fluorination catalysts such as sodium fluoride, etc. can be added to the materials to be fluorinated.

The fluorinated functionalized polymers produced by the process described herein have a wide variety of uses. One use is the formation of heterogeneous catalysts which are formed by tacking homogeneous catalysts, such as sodium manganese pentacarbonyl or sodium rhenium pentacarbonyl, onto fluorinated polymer supports prepared as described herein. The conversion of sodium manganese pentacarbonyl to a heterogeneous catalyst can be illustrated with an acid containing perfluorinated polymer derived by hydrolyzing fluorinated polymethyl methacrylate as follows:

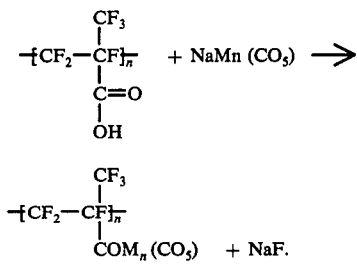

Carboxylic acid groups can also be reacted with a number of organic compounds. Thus, a hydrogenation catalyst for 1-olefins can be prepared by converting carboxylic acid groups to esters, and subsequently reacting the product with a ruthenium complex such as ruthenium [dichlorotris (triphenylphosphine)] in the presence of sodium hypophosphite. The reactions can be illustrated starting with perfluorinated polyacrylic acid as follows:

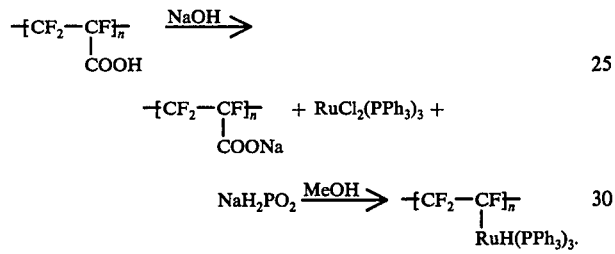

Pendant carboxylic acid groups also provide a convenient site for cross-linking fluoropolymers and one method of achieving such cross-linking is to react the carboxylated polymers with diamines which produces amide cross-linking bridges.

Fluorinated polymers containing functional groups can also be used as conductive films or membranes in many applications such as solid electrolytes, ion exchange membranes, etc.

Additionally, the fluorinated polymers can serve as templates for binding proteins or other molecular species while certain chemical reactions are performed thereon.

The invention is further specifically illustrated by the following examples.

EXAMPLE 1

Direct Fluorination of Vinyl Chloride-Acrylic Acid Copolymer

An apparatus similar to the one illustrated in the FIGURE was used. The reactor consisted of a prefluorinated nickel tube 18 inches in length and having an inside diameter of one inch. It contained a prefluorinated nickel reactant vessel 7½ inches long and ½ inch wide. Fluorine gas flow was measured with a Hastings-Raydist model LF-50 mass flowmeter and model F-50M transducer; oxygen and helium flows were measured with simple gas flowmeters. Needle valves were used to control all gas flows, and ¼ inch O.D. copper tubing served as entrance and exit lines to the nickel reactor. An alumina-packed cylinder was used as an unreacted fluorine trap. To eliminate back diffusion of oxygen produced in the alumina trap as well as possible sources of air and moisture, a one inch O.D. by 6 inch tee joint was placed between the reactor and trap. Gases from the reactor were exhausted into the side of the tee joint and a flow of nitrogen (100cc/min), introduced into the top of the tee joint, was used to constantly flush the alumina trap. The bottom of the tee was connected with copper tubing to the alumina trap so that both nitrogen and the waste gases from the reactor were exhausted through the alumina trap. A standard gas bubbler was placed in the line after the alumina trap to prevent air and moisture from entering the alumina trap when the system was not in use. When the system was in use, the nitrogen also exhausted through the bubbler.

Approximately 0.65 grams of a finely divided (under 150 mesh) copolymer of 95 mole % vinyl chloride and 5 mole % acrylic acid was placed in the nickel reactant vessel in the tubular reactor. The reactor was flushed with helium at 180cc/min. for 1 hour, after which fluorination at room temperature and atmospheric pressure was initiated. The following conditions were used:

| He(cc/min) | $F_2$(cc/min) | Time (days) |
|---|---|---|
| 40 | 0.5 | 2 |
| 10 | 1.0 | 1 |
| 0 | 1.0 | 3 |
| 0 | 2.0 | 4 |
| 0 | 4.0 | 1 |

A white powder was obtained which exhibited a sharp infrared absorption band at 1875 cm$^{-1}$ which is characteristic of acid fluoride (—COF) groups presumed to be present as pendant groups on the fluorinated copolymer. Infrared spectra were run as KBr disks on a Beckman IR20A spectrophotometer. The acid fluoride groups were found to be present in an amount of 2.64 × 10$^{-4}$ mole/gram using the following assay procedure. About 50 mg. of precisely weighed fluorinated copolymer was poured into a 50 ml. beaker containing 10 ml. of 0.1 normal sodium hydroxide and heated for 1 hour. After cooling the solution, 10 ml. of 0.1 normal hydrochloric acid was added and the combined solution was heated for 30 minutes and cooled. This solution was titrated with 0.1 normal sodium hydroxide using a pH meter, and the acid fluoride content was calculated from the difference between the sodium hydroxide required to neutralize the solution and that required to neutralize a blank.

The product showed the presence of no C—H bonds, and was found to contain 21.90%C and 58.79%F.

EXAMPLE 2

Direct Fluorination of Vinyl Chloride-Acrylic Acid Copolymer

The procedure and apparatus of Example 1 were used to fluorinate 0.67 grams of a finely divided (under 150 mesh) copolymer of 91.9 mole % vinyl chloride and 8.1 mole % acrylic acid under the following conditions:

| He(cc/min) | $F_2$(cc/min) | Time (days) |
|---|---|---|
| 40 | 0.5 | 1 |
| 10 | 1.0 | 1 |
| 0 | 1.0 | 1 |
| 0 | 2.0 | 3 |
| 0 | 4.0 | 2 |

The white powder obtained displayed a sharp infrared absorption band at 1873 cm$^{-1}$ and no C—H bond was observed. The COF content was determined to be 4.0 × 10$^{-4}$ mole/gram. Upon analysis, the product was found to contain 22.36%C and 58.94%F. It was also determined that the product had a melting point of 320° C.

EXAMPLE 3

Fluorination of Polymethyl Methacrylate

The procedure and apparatus of Example 1 were used to fluorinate finely divided (100 mesh) polymethyl methacrylate except that the temperature in the reactor was maintained at −30° C. The fluorine and helium flow rates were:

| He(cc/min) | $F_2$(cc/min) | Time (days) |
|---|---|---|
| 40 | 0.5 | 1 |
| 10 | 1.0 | 1 |
| 0 | 2.0 | 1 |
| 0 | 4.0 | 4 |
| 0 | 2.0 | 2 |

The perfluorinated polymethyl methacrylate powder obtained exhibited a carbonyl infrared absorption band at 1830 cm$^{-1}$, thereby evidencing the presence of an ester group. It also exhibited a band at 1200 cm$^{-1}$ which is the C—F stretch band and evidences perfluorination. After hydrolyzing the product, the carbonyl band had shifted to 1880 cm$^{-1}$, which is indicative of carboxylic acid groups. The carboxylic acid content was determined to be $0.73 \times 10^{-3}$ mole/gram.

It will be recognized by those skilled in the art that there are many modifications or equivalents to the reactants, equipment and techniques specifically described herein. Such modifications and equivalents are intended to be included in the claims presented hereafter.

What is claimed is:

1. A process for producing a fluorinated polymer having functionalized pendant groups thereon, comprising:
   a. placing a polymer having a hydrocarbon backbone and having pendant ester, carboxylic acid, acid halide or acid anhydride groups into an enclosed fluorination reactor maintained at a temperature below the decomposition point of said polymer;
   b. flowing a mixture of fluorine gas and an inert gas through said reactor, said mixture having a low initial concentration of fluorine gas;
   c. increasing the concentration of fluorine gas in said mixture on a gradual basis until a high concentration of fluorine gas is reached; and,
   d. maintaining the flow of said mixture having a high concentration of fluorine gas through said reactor until said polymer is substantially fluorinated.

2. A process of claim 1 wherein the flow of said mixture containing a high concentration of fluorine gas is maintained until said polymer is substantially perfluorinated.

3. A process of claim 2 wherein said polymer is a polyalkyl ester of acrylic, methacrylic or ethacrylic acid.

4. A process of claim 2 wherein said polymer is a polyalkyl ester of acrylic acid.

5. A process of claim 2 wherein said polymer is a polyalkyl ester of methacrylic acid.

6. A process of claim 2 wherein said polymer contains pendant carboxylic acid groups.

7. A process of claim 6 wherein said polymer is a polymer of acrylic acid.

8. A process of claim 1 wherein said polymer is in the shape of a film.

9. A fluorinated functionalized film produced according to the process of claim 8.

* * * * *